United States Patent [19]

Chencinski et al.

[11] Patent Number: 5,590,309
[45] Date of Patent: Dec. 31, 1996

[54] STORAGE PROTECTION CACHE AND BACKING STORAGE HAVING SYSTEM CONTROL ELEMENT DATA CACHE PIPELINE AND STORAGE PROTECTION BITS IN A STACK ARRAY WITH A STACK DIRECTORY FOR THE STACK ARRAY

[75] Inventors: Edward W. Chencinski, Poughkeepsie; Jeffrey C. Bixler, Highland; Neal T. Christensen, Wappingers Falls, all of N.Y.

[73] Assignee: International Business Machines Corporation, Armonk, N.Y.

[21] Appl. No.: 222,191

[22] Filed: Apr. 1, 1994

[51] Int. Cl.⁶ .................................................. G06F 12/08
[52] U.S. Cl. .......................... 395/472; 395/449; 395/467; 395/491
[58] Field of Search .................................... 395/471, 472, 395/449, 467, 479, 483, 490, 491, 496

[56]  References Cited

U.S. PATENT DOCUMENTS

| 3,761,883 | 9/1973 | Alvarez et al. | 395/491 |
|---|---|---|---|
| 4,323,968 | 4/1982 | Capozzi | 395/185.05 |
| 4,424,564 | 1/1984 | Hinai | 395/483 |
| 4,445,174 | 4/1984 | Fletcher | 395/448 |
| 4,484,267 | 11/1984 | Fletcher | 395/451 |
| 4,581,702 | 4/1986 | Saroka et al. | 395/417 |
| 4,589,064 | 5/1986 | Chiba et al. | 395/491 |
| 4,658,356 | 4/1987 | Shiozaki et al. | 395/417 |
| 5,018,063 | 5/1991 | Liu | 395/650 |
| 5,023,776 | 6/1991 | Gregor | 395/449 |
| 5,163,096 | 11/1992 | Clark et al. | 395/491 |
| 5,265,232 | 11/1993 | Gannon et al. | 395/451 |
| 5,276,848 | 1/1994 | Gallagher et al. | 395/448 |
| 5,307,477 | 4/1994 | Taylor et al. | 395/403 |
| 5,335,334 | 8/1994 | Takahashi et al. | 395/491 |
| 5,410,668 | 4/1995 | Hilton | 395/466 |
| 5,450,563 | 9/1995 | Gregor | 395/403 |

FOREIGN PATENT DOCUMENTS 0495167  7/1991  European Pat. Off. .

OTHER PUBLICATIONS

Peter M. Kogge, The Architecture of Pipelined Computers, pp. 71–95 & pp. 212–287, 1981.
IBM System/370 Principle of Operation, Mar. 1980, pp. 3–1 through 3–26.
Amdahl, "The Structure of system/360", *IBM System Journal*, vol. 3 No. 2, 1964, pp. 144–164.
Chen et al., "Error–Correcting Codes for Semiconductor Memory Applications: A State–of–the–Art Review", vol. 28 No. 2, Mar. 1984, pp. 124–133.
Fasano et al., "Concurrent On–Line Array Chip Sparing From Scrub–Assisted Fault Data", *IBM Technical Disclosure Bulletin*, vol. 34 No. 7A, Dec. 1991, pp. 16–19.
IBM System/370 Extended Architecture Principles of Operation, Mar. 1983, pp. 3–8–3–12.

*Primary Examiner*—Matthew M. Kim
*Assistant Examiner*—Hong Kim
*Attorney, Agent, or Firm*—Lynn L. Augspurger

[57]  ABSTRACT

A high performance cache and storage control and management scheme for storage protection (SP) bits. The SP bits of interest are "key", "reference" and "change" bits which are architected to prevent unauthorized access to storage and to allow the efficient paging of main storage data. Access to this SP cache (SPC) is achieved via a 5 cycle pipeline. This SPC pipeline will deliver information back to the requestor as well as manage updates to the SPC on cache hits. The pipeline leads to a request stack in the SP storage (SPS) controller. This SPS stack manages the request during its execution in the SPS and the subsequent putaway of fetch results in the SPC. The organization of the cache along with its integration of directory information allow for the utilization of the unique properties of SP data to provide an extremely fast and efficient cache management scheme.

10 Claims, 7 Drawing Sheets

STORAGE PROTECTION CACHE AND BACKING STORAGE HAVING SYSTEM CONTROL ELEMENT DATA CACHE PIPELINE AND STORAGE PROTECTION BITS IN A STACK ARRAY WITH A STACK DIRECTORY FOR THE STACK ARRAY

FIELD OF THE INVENTION

This invention is related to computer systems having a hierarchical memory and particularly to a cache and backing storage mechanism which is responsible for managing storage protection of programs and paging of storage.

GLOSSARY OF TERMS

While dictionary meanings are also implied by certain terms used here, the following glossary of some terms may be useful.

| Term | Definition |
| --- | --- |
| Cache Hit | A Request hits the cache when it finds the data it needs in the cache, thereby saving the time required to access the backing storage. |
| Cache Miss | A Request misses the cache when it finds the data it needs is not in cache, thereby requiring an additional delay to access the backing storage. |
| Congruence Class | The congruence class is that portion of the address that is used to address the cache directory array. |
| Delta-RC | Change to reference and change value while a page is resident in cache. |
| LRU | Acronym for Least Recently Used, refers to specific bits in a cache directory and the algorithm which is used to select the castout data based on these bits. The goal is to cast out that data which will not be needed in the future. |
| Overindication | To set the reference and change bits to 1's thereby assuming, when in doubt, that the data has been changed. This is used to protect data integrity in the case of damaged store protect information. |
| Requestor | Processor or I/O port into System Control Element which is capable of storage access. |
| RC | Acronym for Reference and Change, the SP bits that keep track of whether a given page has been referenced or changed. |
| Residue | The residue is that portion of the address that is compared to determine if a cache hits. The requestor's residue is taken from the request address register, while the residue(s) of the resident cache data is taken from the directory location pointed to by the request's congruence class. |
| SCE | Acronym for System Control Element, the part of a multiprocessing system that connects together the processors, I/O and main storage. |
| SCRUB | A mechanism that periodically sweeps through memory searching for errors and correcting the errors before they accumulate and become uncorrectable. |
| SP | Acronym for Storage Protection, the function in a computer system responsible for controlling key access to storage and deeping track of the references and changes to each page of main storage so that the operating system can perform efficient paging. |
| SPC | Acronym for Storage Protection Cache, a cache of a frequently referenced subset of the SP data. |
| SPS | Acronym for Storage Protection Storage, the array and controls used to manage SP data for the entire main storage. |
| SP Violation | SP Violations are returned to the processors any time a program attempts to access a page of storage without the proper key. |
| Store through Cache | A small high speed memory holding a frequently used subset of the main storage such that every store is atomically executed in both the cache and the next level of storage. |
| Store In Cache | A small high speed memory holding a frequently used subset of the main storage such that every store is directly executed in only the cache. When new data needs to be brought into such a cache, a line of data is selected for casting out. The latest value is then moved from the cache to the next level of storage, and that address is no longer considered resident in the cache. |

REFERENCES USED IN THE DISCUSSION OF THE INVENTION

During the detailed description which follows the following works will be referenced as an aid for the reader. These additional references are:

U.S. Patent Document 4,445,174, granted Apr. 24, 1984 to Fletcher entitled "Multiprocessing System Including A Shared Cache" and assigned to IBM.

European Patent Application 91119001.5 filed Nov. 7, 1991 of Bean, et al. entitled "Multiple Asynchronous Request Handling."

U.S. Patent Document 5,265,232, granted Nov. 23, 1993 to Gannon, et al entitled "Coherence Control Data Invalidation in Selected Processor Caches Without Broadcasting to Processor Caches Not Having the Data" and assigned to IBM.

IBM System Journal v.3 no.2 1964; "The Structure Of System/360, part III", by G. M. Amdahl pp. 144–164.

IBM System/370 Extended Architecture, Principles Of Operation, by IBM Corporation, March 1983, pages 3-8 to 3-12.

IBM Technical Disclosure Bulletin v.34 no.7A December 1991; "Concurrent On-Line Array Chip Sparing From SCRUB-Assisted Fault Data," by L. T. Fasano et al. pp. 16–19.

IBM Journal Of Research And Development v.28 no.2 March 1984; "Error-Correcting Codes for Semiconductor Memory Applications: A State-of-the-Art Review," by C. L. Chen et al. pp. 124–133.

These additional references are incorporated by reference.

BACKGROUND OF THE INVENTION

A cache and backing storage mechanism is responsible for managing the keys, reference and change (RC) bits required for storage protection purposes in computer systems. The IBM System/370 Extended Architecture Principles Of Operations, 1983, discusses the use of the keys and RC bits on pages 3-8 to 3-12.

Futhermore, IBM System Journal, v.3 no.2 1964 pages 144–164 outlines the logical structure of the the System 360, with specific description of the storage protection keys. Each program and each page in main storage is assigned a key. When a program attempts to access a page of storage its key is compared with the key assigned to that page; if the keys match then access is allowed. If a data fetch is allowed, then the page's reference bit is set at the time of access; if a data store is allowed, then the page's reference AND change bits are set at the time of access. All of these bits can be directly read and written through special instructions (KEY OPs) by the operating system.

Access to these Storage Protection (SP) bits needs to be very fast because fetches and stores of data are held off while the keys are checked. Therefore, past implementations have kept all of the SP bits required for every location of main storage in a large high speed array in the head of the system control element (SCE). This is an expensive proposition which uses up valuable real estate and has prevented the growth of main storage because of the lack of room in the SCE.

SUMMARY OF THE INVENTION

The invention deals with the use of a high performance cache and backing storage structure for storage protection (SP) bits.

The improvements which we lave made achieve excellent average access time to SP data while freeing up critical circuit space in the head of the system. Futhermore, exceptional fault tolerance is achieved. The mechanism is integrated into a shared data cache structure in a manner that is virtually transparent to the requestors.

These improvements are accomplished by providing an apparatus containing and managing a cache and backing storage for keys, reference and change bits. Access to the SP Cache (SPC) is via a 5 cycle pipeline. Requests that also need SP Storage (SPS) resources go through this pipeline to the SPS, where they are loaded into a stack for the duration of their execution. The performance critical KEY-fetches (on SPC misses) can start execution in an SPS array while their request information is still being loaded into the SPS stack; other request types get loaded into the stack first and compete for priority from there. The SP cache and storage works in concert with a previously existing data cache and main storage, but the SP controls are autonomous to allow for increased performance and fault tolerance based on the inherent differences in the structure of the SP and data caches.

These and other improvements are set forth in the following detailed description. For a better understanding of the invention with advantages and features, refer to the description and to the drawings.

BRIEF DESCRIPTION OF THE DRAWINGS

FIG. 1a illustrates the SP key cache & storage while FIG. 1b illustrates the SP RC cache & storage.

FIGS. 2, 2a, and 2b are the second level diagram of the SPC control and dataflow.

The detailed description explains the preferred embodiments of the invention, together with advantages and features, by way of example with reference to the following drawings.

DETAILED DESCRIPTION OF THE INVENTION

Before considering the preferred embodiments in detail, it may be worthwhile to point out that in accordance with the invention a Storage Protect Storage (SPS) has been provided consisting of a set of N KEY arrays and N RC (reference and change to track page accessing) arrays that can be independently and simultaneously accessed. Each of the N independent SPS KEY arrays contains identical values of all the keys needed to cover the entire main storage, so that any one of the arrays can be arbitrarily accessed to get any key. Each of the N independent SPS RC arrays contains potentially unique delta-RC values. A delta-RC value is the difference between the original RC value and the current RC value. OR-ing the castout SPC delta-RC value into a delta-RC value already in the backing storage simply provides an accumulated delta-RC for both periods of cache residence. In this manner a single backing storage RC value can reflect the change to the RC values across many separate instances of cache residence. Thus the real RC value is determined by ORing together all of the delta RC values. The independence of these SPS arrays allows quick access to multiple keys simultaneously, thereby allowing the processors to access their requested main storage data quickly by providing rapid key checking. The Store Protect Cache (SPC) is a cache containing the most frequently accessed SP entries. The KEY portion of this cache is store-through; the RC portion is store-in of the delta to the RC while the page has been resident in the SPC. This permits caching the SP bits in a manner analogous to the caching of main storage data in a shared cache in the system control element.

Figure 1A:
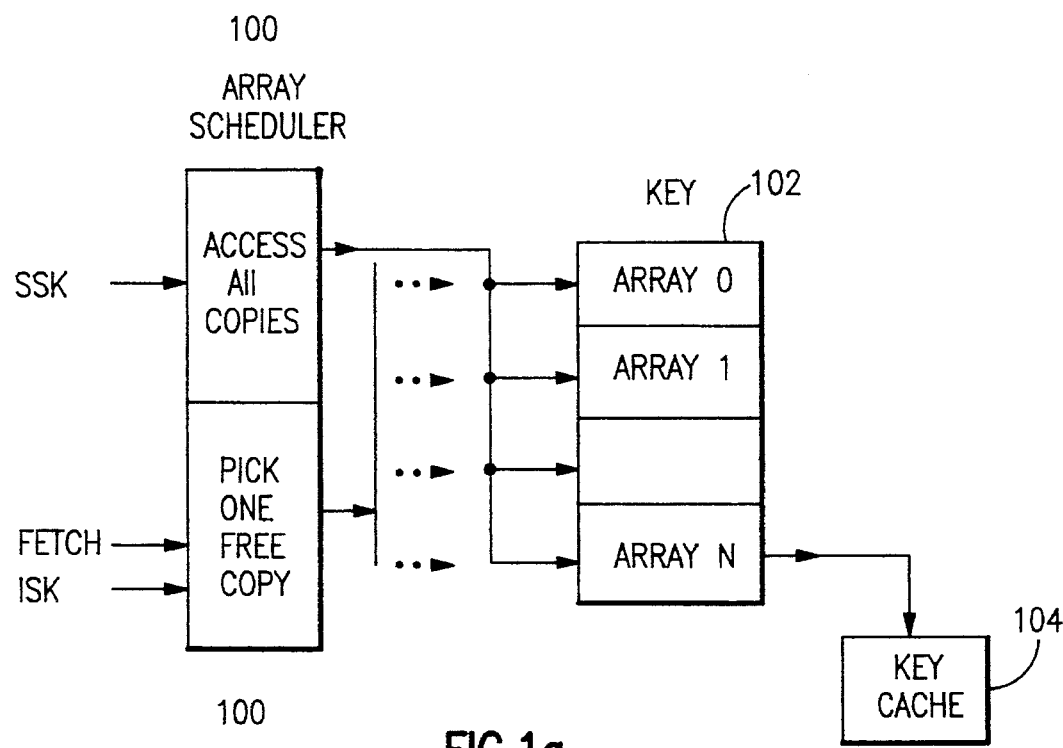
FIGS. 1a and 1b describe the basic SP cache and storage functional operation and illustrates which SPC and SPS arrays are required for each type of request.
Figure 1B:
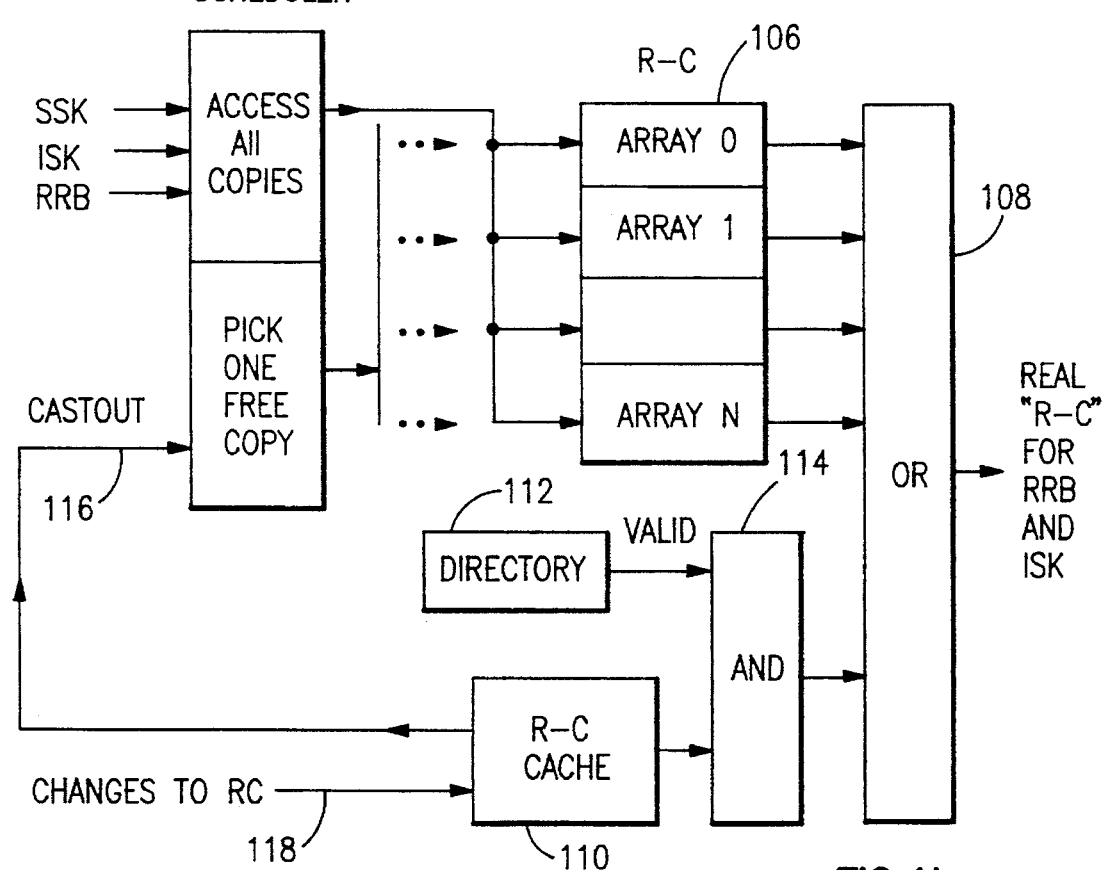

FIGS. 1a and 1b show the logical structure of the SPC/SPS subsystem. FIG. 1a illustrates the SP key cache & storage while FIG. 1b illustrates the SP RC cache & storage. The array scheduler (100) is a set of controls that schedules requests to execute in the independent SPS arrays (key (102) and RC (106)) as required. FIG. 1a shows that a Set Storage Key (SSK) request is scheduled to execute on all independent key array (102) copies because all N key copies must be updated with identical values. Fetches can be scheduled on any one of the array copies; therefore the SPS can service N key fetches simultaneously. Note that Insert Storage Key (ISK) is a KEY OP that returns the current KEY and RC value for a specified page, so it is scheduled on one key array just as the fetch was. Finally, note that there is no KEY castout because the key cache (104) is a store through cache. KEYs go from the SPS key arrays (102) into the key cache (104) when they are fetched from the SPS.

The RC structure in FIG. 1b is markedly different from the KEY structure. The three KEY OPs, SSK, ISK and Reset Reference Bit (RRB), access all N RC array (106) copies. This is because the real RC is the OR (108) of the delta RCs in the N RC array (106) copies as well as the SPC value held in the RC-Cache (110) if the request has a valid hit in the SPC. While a page is resident in cache, any change to the RC values (118) (caused by fetches and stores to the data) are accumulated in the Store Protect Cache (SPC). Whether a hit has occurred is determined from the directory (112). The hit signal is then AND-ed (114) with the RC value from the RC-cache (110) to determine the cache contribution to the real RC. Finally, castouts from the SPC are scheduled in only one RC array, where the castout delta-RC is ORed (116) into the value already in that RC array.

This structure offers very attractive performance: an SPC miss generates a KEY fetch and an RC castout, therefore the SPS can service N separate SPC misses simultaneously. Furthermore, the structure is well suited to high fault tolerance because it allows the dynamic trading off of performance to maintain availability when failing arrays are taken offline. The system can continue with a minimum of one SPS KEY array (102) and one SPS RC array (106). Key arrays can be taken offline without any recovery, and RC arrays can be taken offline after over-indication of all RC bits in one of the remaining RC arrays.

Figure 4:
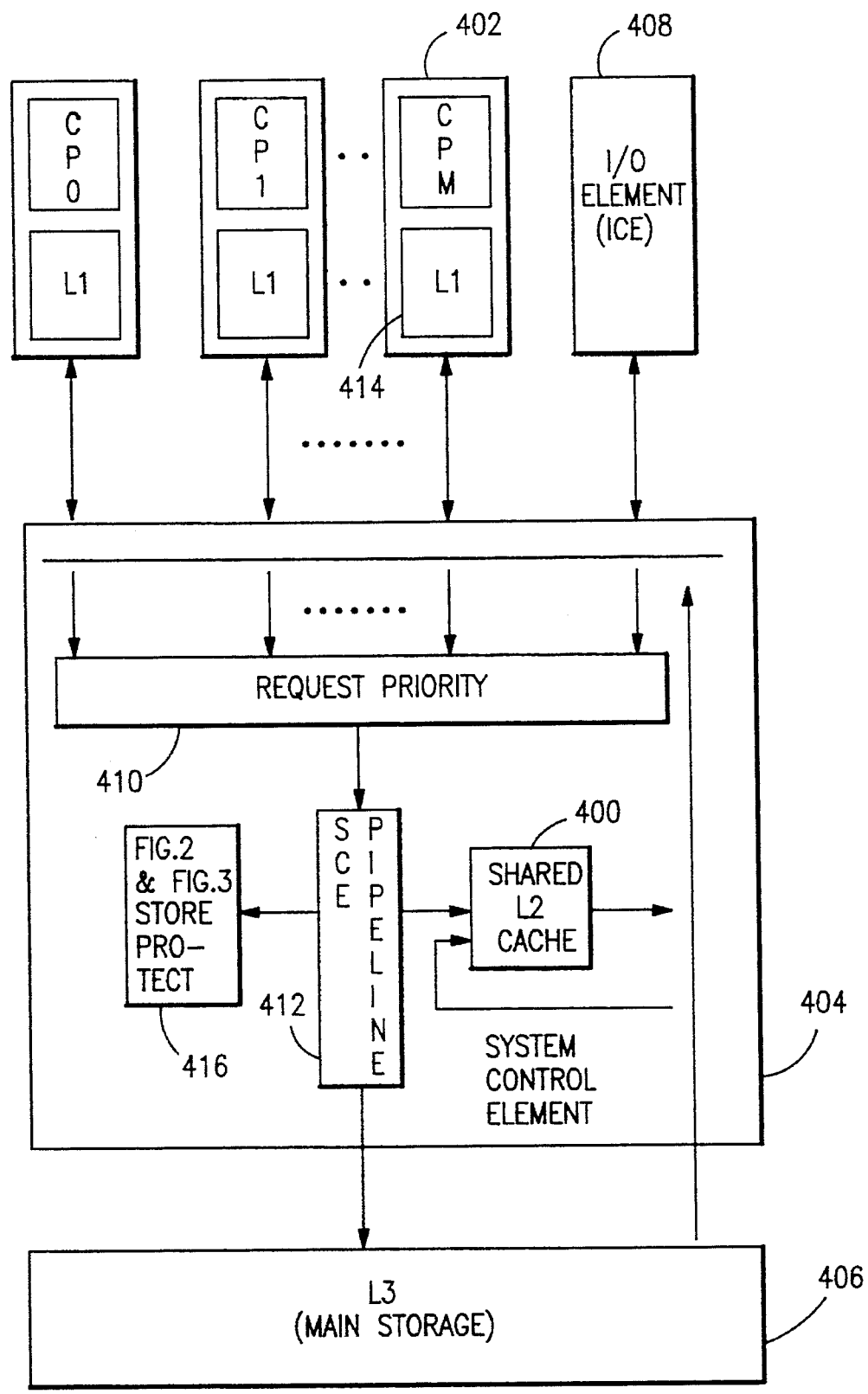
FIG. 4 illustrates a multiprocessing system which contains a shared data cache and pipelined processors used to implement the invention.

FIG. 4 illustrates a multiprocessing system which contains a shared data cache (400) and pipelined processors (402) used to implement our invention. A brief description of the System Control Element (SCE) (404) that the disclosed SP Cache & Storage (416) resides in would be appropriate before proceeding. Note that the disclosed design is not limited to being pad of this SCE, but reference is made to this SCE as an example of a data storage structure that the SP (416) would fit into. The SCE of this multiprocessing (MP) system contains a shared data cache that contains a frequently referenced subset of the lines of the main storage (406). U.S. Pat. No. 5,265,232 (Gannon et al.) teaches the general cache coherency of such a structure, while U.S. Pat. No. 4,445,174 (Fletcher) teaches another shared L2 approach. The data cache (400), sometimes referred to as the L2 cache, is a shared store-in cache. The requestors to the SCE (404) can be processors (CPs) (402) or I/O elements (ICE) (408). The SCE priority circuit (410) selects one of these requestors per cycle if there are resources available to act on its request. Once selected, the request flows through an SCE pipeline (412) to access the L2 directory and to send out cross interrogation (XI) requests to all of the CPs (402) that might have exclusive copies of the requested data in their primary caches (414). If the data is not in the L2 (400), and therefore not in any CP cache (414), then the SCE (404) kicks off a main storage (406) fetch and puts away the data into the L2 (400). European Patent Application 91119001.5 (Bean, et al.) teaches this structure, including its utilization of requestor "needs" to control each request's access (through the priority) to the pipeline and thus the SCE resources.

The Preferred Embodiment

Figure 2:
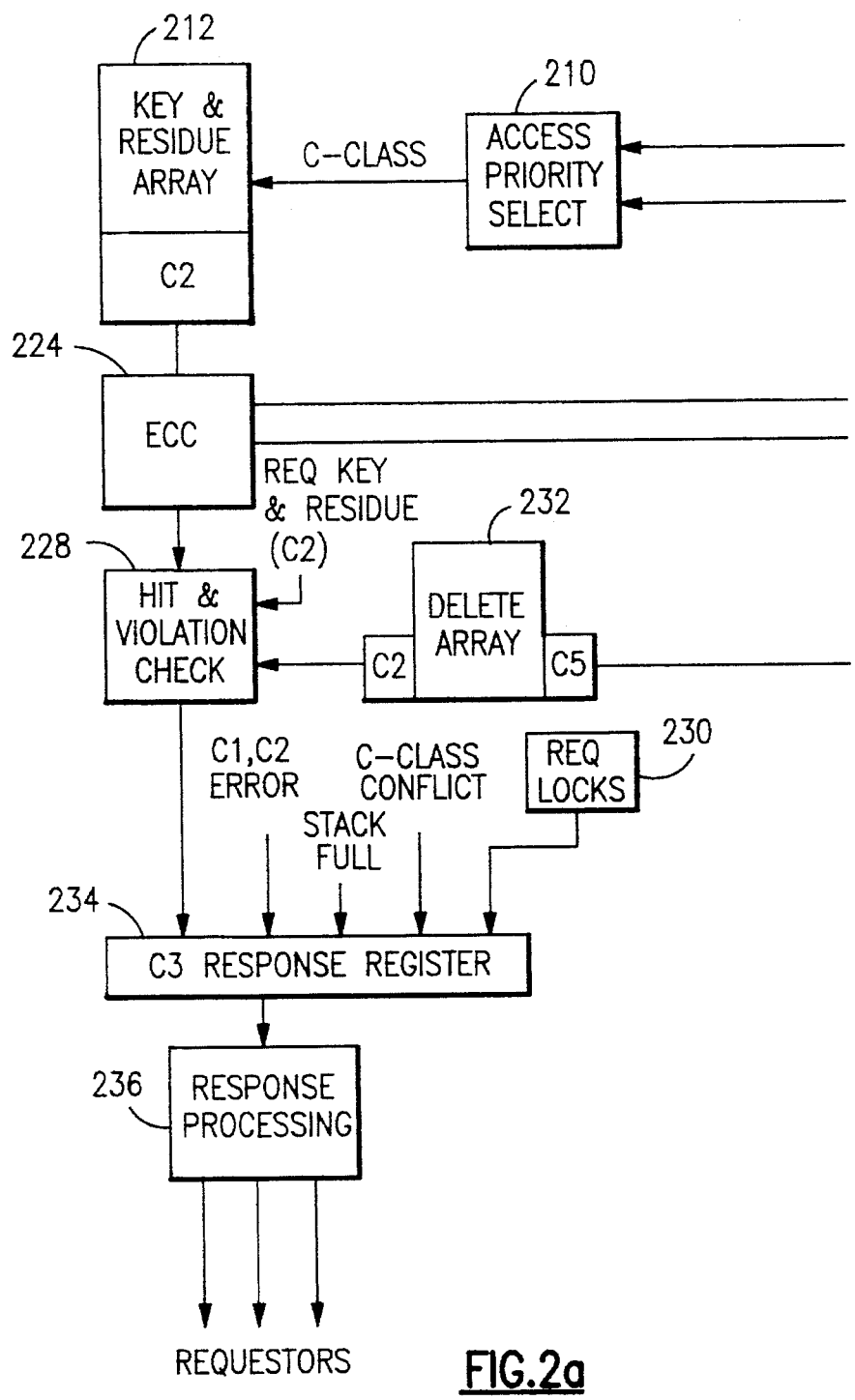
Figure 2:
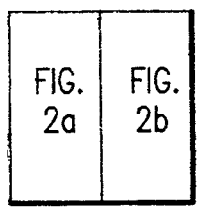
Figure 2B:
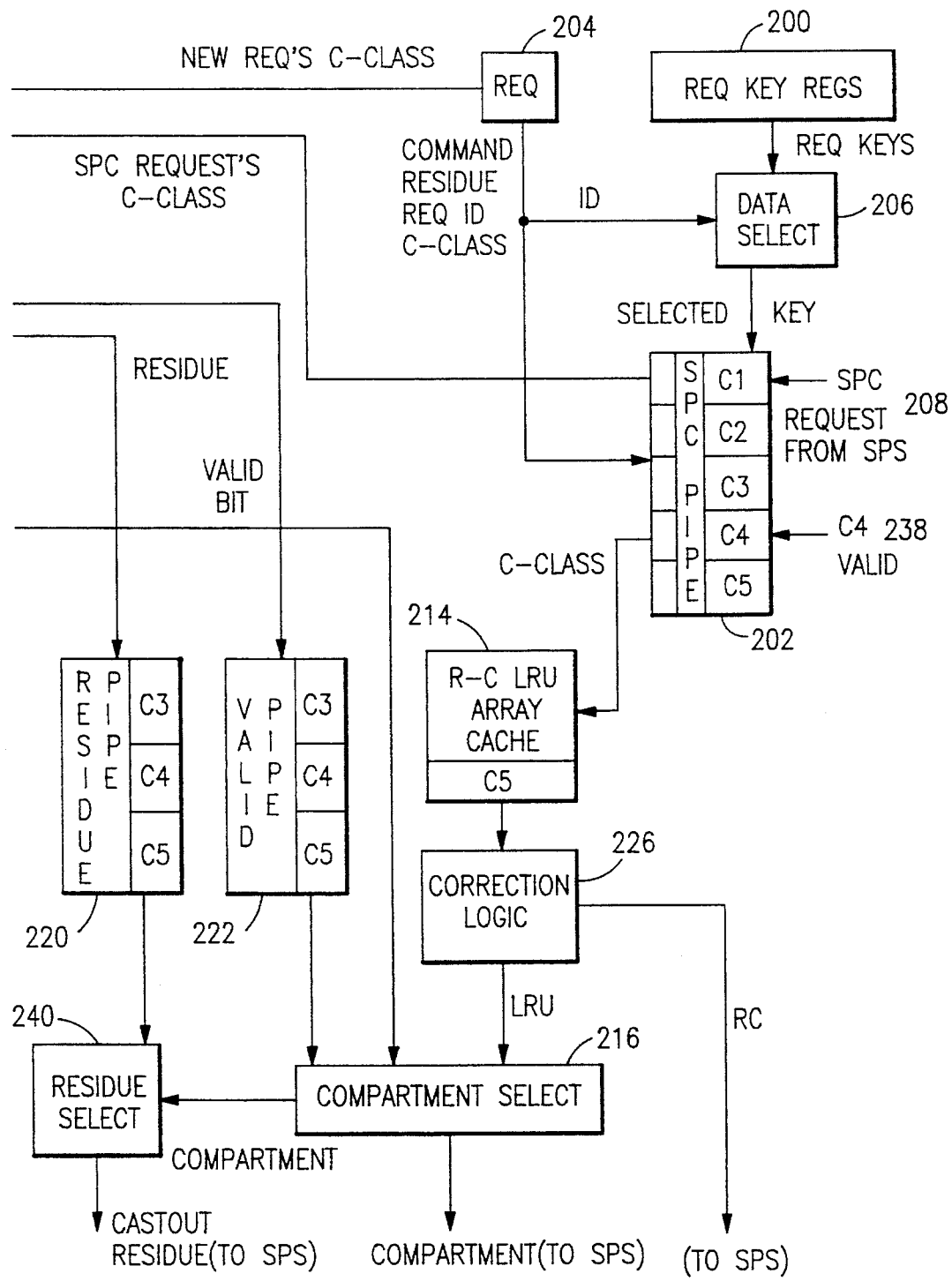

Turning now to our invention in greater detail, refer to FIG. 2, the second level diagram of the SPC control and dataflow structure. Request Keys from the request key registers (200) enter the 5 cycle SPC pipeline (202) at the top right side of the diagram. Because only one ID from the request (204) can be operated on per cycle, a data select (206) is used to select the key for the current cycle. This pipeline (202) is synchronized with the SCE data cache pipeline (412) for requests that need action from the SPC. The SPC pipeline (202) only acts on each request once; if a request is accepted then the SPC pipeline will never accept that request from the SCE data cache pipeline (412) again.

Note that requests are also shown to enter the C1 cycle of the pipeline from the SPS on the right (208). These would be putaways of fetched KEYs returning from the SPS when the SPC has missed. (See FIG. 3 discussion for SPS putaway details.) Besides putting away the returning SPS KEY into the SPC, these requests also set the SPC RC value to reflect the type of access to data storage that the requestor is seeking. The request (204), made up of command, residue, request ID and congruence class are shown to enter the SPC pipeline (202) in the C2 cycle, coming from the SCE data cache pipeline (412). The congruence class is needed as soon as possible, however, to start off the access of the SPC, so a selection (210) is performed on the C1 cycle between the new SCE request (204) and the SPC request (208), and the result is used to access the SPC key array (212).

The SPC has been structured as two arrays: the KEY array (212) is accessed in the C1 cycle of the SPC pipeline (202) and the RC array (214) is accessed in the C4 cycle of the SPC pipeline (202). The KEY array (212) includes the residue and validity bit in every KEY Error Correction Code (ECC) word, resulting in a combination of hit determination and KEY delivery in a single array. The logic needed to determine hits and congruence class conflict conditions requires a few cycles, so by C4 the determination has been made as to whether to update the RC bits (HIT) or castout an RC value (MISS). The RC array (214) includes the LRU bits which are therefore updated along with the RC value on a hit. When the SPC misses, on the other hand, the LRU and the RC's are read, the LRU is decoded and the castout RC value with its residue (240) and compartment (216) are selected "on the spot". The end result is that by the time the request that missed the SPC arrives at the SPS interface (302) in FIG. 3, all of the information required to kick off a KEY fetch and a corresponding RC castout is available.

Note that the residue pipeline (220) also holds the four residues fetched from the KEY cache (212) until the LRU has been fetched from the RC cache (214) The number of compartments (equal to the number of residues) in the SP cache were chosen based on performance requirements and available silcon real estate. This disclosure will assume an SPC containing four compartments, but in general the number of compartments should be as large as possible for a given machine design. When the LRU has been fetched the castout residue is selected and the other residues can be dropped. There is a validity bit which is also pipelined (222), which can be turned off for a host of reasons (such as errors or addressing violations) and which disables the operation of the request as it flows through the pipeline. Finally note that both of the cache arrays (KEY (212) and RC (214)) contain error correction information which allow for inline correction (224) and (226) of single errors and detection of double errors and the most probable multi bit errors.

The SP (416) is required to operate on the physical address to allow for dynamic address reconfiguration. However, it is highly desirable to allow access to the SPC in the very first pass through the SCE pipeline (412) to maximize performance. The size and shape of this cache were chosen so that all physical address bits that come from the configuration array could be assigned as residue bits of the SPC. This allows parallel access of the SPC and the configuration array. That is, the hit determination (228) cycle is not delayed because the residue arrives from the configuration array just as the SPC directory information arrives from the ECC correction logic. (224). The referenced article by Chen et al. teaches industry wide practices of Error Correction Code design and implementation.

The "hit" and "violation" results are combined with other status information available in C3 to determine the overall status of the request. Note that some of this status is available in C2 and is therefore buffered in a C3 response register (234) to synchronize it with rest of the status results. The combined status is encoded and sent out as responses to the requestors and to the SCE data pipeline controls through the response processing circuitry (236). The requestor uses this response to determine if the SP's portion of the request processing is complete, and whether to retry the request at a later time when a needed resource is available. The SCE data pipeline (412) controls use this response along with responses from other pads of the SCE to determine if the request processing should continue. This "GO/NO-GO" result is distributed by the SCE data pipeline controls to the entire SCE through the "C4 Valid Bit" (238).

The fact that there are two independent caches in the SCE (L2 data (400) and SPC (110) and (104)) introduces a significant danger of new hang scenarios. A request could hit the SPC and miss the L2. After fetching the L2 data it would hit the L2 but could miss the SPC if the location had been castout from the SPC while the data was being fetched for the L2 miss. The pattern of hitting one cache and missing the other could continue indefinitely in a ping-pong pattern. The problem is solved with a requestor lock (230) in the SPC. The first time the key is fetched (from SPC or SPS) it is locked in a request register dedicated to the requestor. Subsequent passes through the SCE pipeline (412) will always force a HIT response; the ping-pong problem is avoided.

Figure 3A:
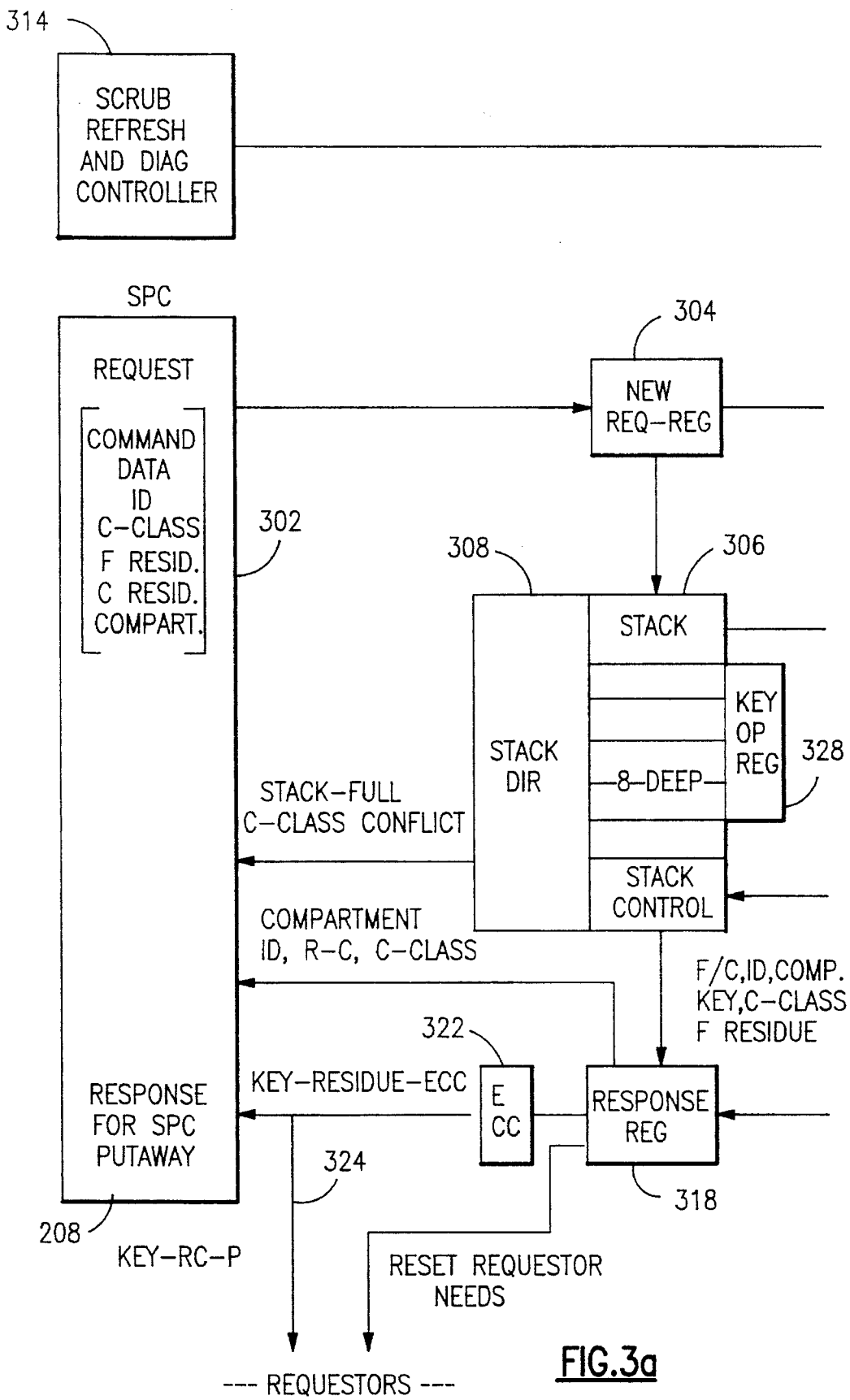
FIGS. 3, 3a, and 3b are the second level diagram of the SPS control and dataflow.
Figure 3B:
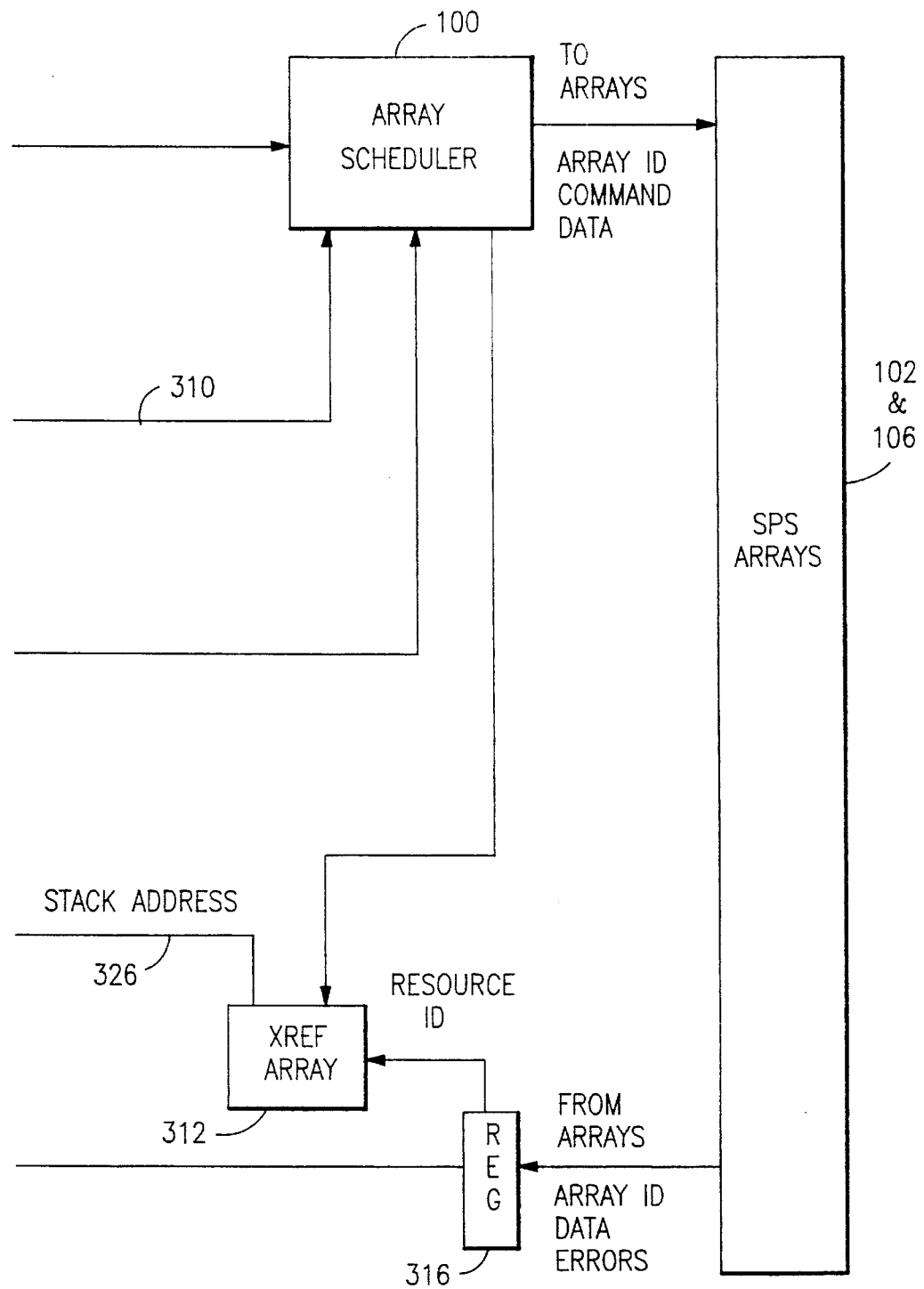
Figure 3:
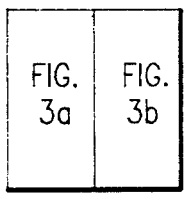

FIG. 3 shows the structure of the SPS dataflow and controls. Requests that have missed the SPC enter the SPS from the interface (302) on the left of the diagram. From the SPC interface (302) the request is staged in the New Request Register (304) for timing purposes. All requests that require access to the SPS are loaded into a request stack (306) as they arrive from the SPC. That is, all the pertinent information required to execute the request (address, ID, KEY, ETC. . .) are loaded into embedded arrays and the command is decoded into the exact information required to compete for priority to the SPS arrays (102) and (106). The results of the decode are placed in latches, along with a pointer to the request's embedded array location, for immediate and parallel access by the SPS priority logic. This set of latches is called the stack directory. (308)

Figure 5:
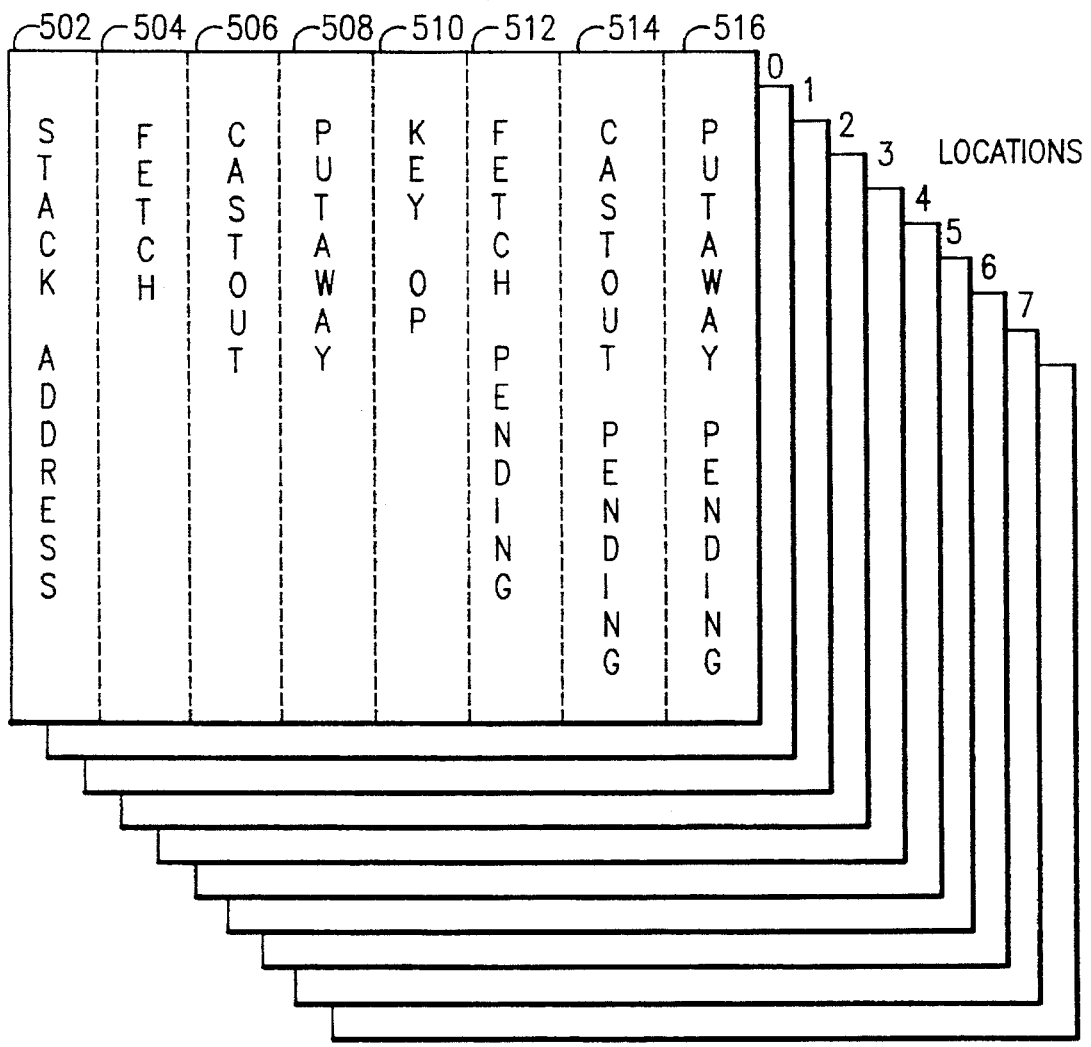
FIG. 5 illustrates the contents of the SPS stack directory.

FIG. 5 shows the contents of the stack directory. The stack directory contains the following fields for each stack position: Stack Address (502), Fetch Request (504), Castout Request (506), Putaway Request (508), Key Op Request (510), Fetch Pending (512), Castout Pending (514), and Putaway Pending (516).

The Stack Address (502) points to the location of the request information in the stack array. Note that this stack address is constant throughout the life of the request in the stack, despite any movement of the request in the stack directory. The Fetch (504), Castout (506), Putaway (508) and Key Op (510) request bits indicate that the request needs to execute the corresponding operation. Note that more than one of these bits can be set for a given request, although no combination of Key Op and any of the other bits will ever occur. Finally the Pending bits (512)–(516) indicate that the corresponding type of operation has been set in motion in the SP arrays, and the stack controls are awaiting a response to the operation.

Back in FIG. 3, the stack directory (308) manages retries of requests that have failed to complete properly in the SP arrays. This failure can be flagged in the response code returned front the SP array or it can be detected in the SPS controller itself on the way to and from the SP array card. For example, one way that the failure can be detected is by a timeout of the response from the SP array card. The stack directory controls retry a failing request to a given array up to seven times before giving up on the request in that array and taking the array offline. Note that some failure modes present the danger of damage to data integrity. Responses that indicate such "damage errors" cause the stack directory to immediately take the given array offline, without retrying seven times.

The SCRUB controls (314) manage the actual sequence required to take a resource offline. SCRUB first attempts to clean up an array that's been damaged and return it back online, but if this isn't possible (because of continuing failures) the array is taken fully offline.

Key fetches (for SPC misses) go right to an SPS array when they arrive from the SPC if a Key array (102) is available to service them (310). In any event, all requests are placed in the stack (306) and can compete for priority to the N key (102) and N RC (106) arrays. Note that SCRUB and diagnostic requests (314) also enter priority to get to the SPS arrays to clean up errors and gracefully take broken arrays offline. (Broken SPS Key arrays can be taken offline without any consequences. However, when a broken SPS RC array is taken offline SCRUB must overindicate every RC in a remaining RC array to avoid data integrity exposures.) For additional information on using SCRUB techniques to find memory errors and take corrective action, see the referenced article by Fasano, et al. which describes an earlier implementation of SCRUB for expanded storage.

When a request gets priority in the array scheduler (100) it is transmitted to the array(s) that will execute it. Since these arrays are in a relatively distant physical location, a local cross reference array (312) that holds a small amount of information for active array requests is implemented to allow the proper handling of the response from the interface register (316) where it is placed upon arrival from the array. Successful responses are staged in a response register (318) from which they can kick off a putaway of the fetched key into the SPC (208). Keys from successful responses are corrected (322) on their way to being put away into the SPC. Successful responses (with corrected keys) will mark that piece of work as complete (326) in the request's stack location, and can also return a response to the original requestor (324)

KEY OPs have different needs from regular cache misses: they need to read/write all of the RC arrays (106) and one or all of the KEY arrays (102) Because of this they compete to get out of the stack (306) into a KEY OP execution register (328), from which a request will compete in the regular priority to get to the SPS arrays (102) and (106) that are needed for execution.

The SSK KEY OP illustrates the function of the KEY OP execution register. As can be seen in FIG. 1, fetches and castouts each access a single SP array. The same is true for SPS putaways. SSK, in contrast, needs to access all SPS arrays. Therefore the Key Op register (328) and the array scheduler (100) work together to schedule the SSK to each online array (as each array becomes available). This may mean that all arrays work on the request concurrently or it may mean that only one or two arrays are actually executing the SSK at a given time. In any case, when the last array response returns successfully, the Key Op register is reset and the operation is cleared out of the stack (306).

It is worthwhile digressing at this point to describe the SPC/SPS interaction required to perform a Key Op. Key Ops complete in the SPC before they reach the SPS stack (306). As the request reaches the stack it brings with it partial results from the SPC (assuming the request hit the SPC). For example, if an ISK hits the SPC it reads out the RC value and loads it into the stack with the rest of the request. When this Key Op gets loaded into the Key Op register (328), this partial information is loaded as well. The responses from the SPS arrays (102) and (106) are combined with this partial result as they return, and when the last response returns the final result is forwarded to the requestor.

Cache designs in general must provide mechanisms for "congruence class protection", that is, they must insure that no two requests are active in one location of the cache at one time in such a way that an update to the cache made by one request is lost because of an update to the cache made by another request. The conventional cache design uses reject signals to the requestors to hold them off when they encounter a congruence class conflict. The design chosen for the SPS stack (306) however, makes use of the unique properties of the SPC and SPS to avoid the requirement of rejecting the request and eventually recycling it through the SCE pipeline. It accomplishes this through a unique stack directory bit called SPS PUTAWAY (508). This bit is set when a request gets a congruence class conflict against an existing request in the SPS stack (306). When the SPS PUTAWAY bit is on, the RC update for the corresponding request is done in an SPS array instead of the SPC array, thus negating the possibility of damaging any SPC update made by the first request to that congruence class. Similarly, if a request with this SPS PUTAWAY bit on also missed the SPC, then the SPS key fetch done on its behalf would not be loaded into the SPC (208), but would simply be returned to the requestor (324) when the SPS key fetch completes.

Note that congruence class conflict checking is done via address compares between the incoming request from the SPC interface (302) and only those requests in the SPS stack (306) that intend to putaway their RC updates into the SPC. This is important because only those requests present any danger of overlay of information, so the number of SPS putaways can be minimized by only applying conflict checking to the minimum number of requests.

Additionally, this SPS PUTAWAY bit allows the KEY OPs to complete their execution in the SPC before they are loaded into the SPS while effectively maintaining the architectural ordering of the RC updates relative to the KEY OPs. This results in simplification of controls because a second pass through the pipeline (220,202,222) isn't required when a KEY OP completes in the SPS. The design allows for the KEY OPs to complete in the SPC before they execute in the SPS by giving congruence class ownership to any incoming KEY OP; the SPS PUTAWAY bit is set for any request in the stack that conflicts with an incoming KEY OP. This insures that the KEY and RC updates of the KEY OP are not overlaid in the SPC by a request ahead of it in the SPS stack. Furthermore, the natural execution order of the stack insures that any RC reads done by a KEY OP will pick up the RC update (that was forced to occur in the SPS) for any requests ahead of the KEY OP.

A further benefit of creating the SPS PUTAWAY bits is that it avoids the cost of building an SPC putaway buffer and the associated control logic. There are certain cycles when the SPC is tied up by KEY OP processing and cannot accept the putaway of the KEY that has just been returned from the SPS. This is extremely rare, but provisions must be made to stop an SPC putaway nonetheless. Without the SPS PUTAWAY bit we would be forced to buffer the SPC putaways until a time after this forbidden cycle, as well as provide priority controls to avoid colliding with the direct SPC putaway path that comes right from the SPS key fetch response.

Another useful aspect of this design structure is that it allows the SCE (404) to function properly when pad or all of the SPC is offline. The SPC array is divided up into delete regions based on the most probable physical failure mechanisms. There is a delete array (232) shown in FIG. 2 with one bit for each of these regions, and if this bit is on then a miss is assumed in that region. When a hard uncorrectable error occurs the corresponding bit is set in this delete array (232) and all of the RC bits in the SPS that may have been on in this deleted region are overindicated by a diagnostic sequence. When all SPC regions have been deleted the SPC naturally returns a miss. Furthermore, when all SPC regions are deleted the stack logic is set up to artificially force constant congruence class conflicts. The result of this combination is that all keys are returned to the requestors from the SPS, and all RC updates are performed in the SPS as well. The SCE can therefore continue to run without any SPC, albeit at a lower performance level.

Alternative Preferred Embodiments

An alternate method of implementing this disclosure would be to combine the SPC Key array (212) with the RC array (214) and create controls in the requestors for execution of multiple pass operations. This would increase the complexity of the requestor's need latches and controls. The requestor would use a second pass to set the RC bits in the case of a hit. Misses, on the other hand, would require a second pass to select a castout residue for forwarding to the SPS. If this implementation was chosen, there would be no need for the SPC pipeline (220,202,222) and the performance critical miss determination (which is required to kick off an SPS Key fetch) could still be optimized to avoid performance degradation. Furthermore, the SPC/SPS interface (302) could be simplified by making the SPS into a regular SCE requestor. Specifically, the access priority selector (210) and the SPS-to-SPC putaway path (208) could be removed as well, if the requestors themselves had the controls required to manage the putaways of the SPS keys into the SPC. In fact, the requestors themselves could manage the execution of their operations in the SPS as well, and the SPS stack (306), stack directory (308) and much of the array scheduler (100) would no longer be required. The drawbacks of such an embodiment are very significant: additional complex controls in each and every requestor, as well as an increase of complexity in the already complex main SCE priority circuit. This would in turn result in a greater chance of hang scenarios, because the preferred autonomous SP design allows the untangling of the SP cache/storage algorithms from the data cache/storage algorithms.

Note that another alternate method of implementation would be to remove the cross reference array (312) and pass the pertinent information to the SPS arrays (102) and (106) when the request goes out (and back from the arrays as pad of the response when the request completes). The obvious drawback is the additional I/O, which may not be considered a problem in specific applications.

Industrial application of the invention

The properties inherent to this SPC/SPS structure can be utilized to provide advantages in fault tolerance and requestor control simplicity. Specifically, the disclosed SP cache and storage structure allows the following:

All of the information required to fetch AND castout for an SPC miss is gathered in the first pass through the SCE pipeline. This makes use of the same first pass that was already defined in the previously existing algorithms to determine if the data cache hit or missed.

The SPC has been structured in a way that eliminates the need for a separate cache directory.

The SPC congruence class & residue addressing has been chosen such that the SPC can be accessed in parallel with the configuration array, thus abrogating the need for a separate pass while still allowing for dynamic address reconfiguration through the configuration array.

The potential for hangs caused by continuously ping-ponging misses of the data and key caches is eliminated.

Congruence class conflicts are handled in a manner that is transparent to the requestor, thereby simplifying the requestor's controls and returning a response much faster than the conventional design could.

The system can continue to service requests with any number or combination of pieces of the SPC taken offline, all the way up to the entire SPC being taken offline.

The system can continue to service requests with all but one SPS Key and one SPS RC array taken offline.

While we have described the preferred embodiments of the invention, it will be understood that those skilled in the art, both now and in the future, may make various improvements and enhancements which fall within the scope of the claims which follow. These claims should be construed to maintain the proper protection for the invention first disclosed.

What is claimed is:

1. A data processing system having a hierarchical memory comprising:

a plurality of processing elements;

said hierarchical memory including a main memory and a primary cache for each of said plurality of processing elements;

an input output element;

a system control apparatus coupling said plurality of processing elements and said input output element to said memory;

said system control apparatus providing:

(a) a system control element data cache pipeline for receiving requests from said plurality of processing elements or from said input output element;

(b) a shared cache portion of said hierarchical memory; and (c) a storage protection cache and backing storage unit including a storage protection cache, a storage protection backing storage coupled to said storage protection cache, and a storage protection store stack for controlling access to said storage protection store, and a set of latches forming a storage protection store stack directory for a request stack of requests that require access to said storage protection storage, said stack directory having stack positions and containing for each stack position pointer fields including a stack address field, a fetch request field, a castout request field, a putaway request field, a Key Op request field, a fetch pending field, a castout pending field and a putaway pending field, and a storage protection cache pipeline which is coupled for receiving said requests either from said system control element data cache pipeline or from said storage protection store.

2. A data processing system according to claim 1 wherein:

said storage protection cache includes a first storage protection cache array for storing keys for accessing said main memory and for storing residues for determining whether a request has hit or missed said storage protection cache, and a second storage protection cache array for storing reference bits and change bits for indicating whether data associated with said reference bits and change bits has been referenced or changed by a request.

3. A data processing system according to claim 2 wherein said first storage protection cache array includes a first plurality of compartments for containing elements including:

(a) a plurality of stored keys for accessing said main memory;

(b) a plurality of stored residues respectively associated with said plurality of stored keys for determining whether a request has hit or missed said storage protection cache; and (c) a plurality of validity bits associated with said plurality of stored residues and said plurality of stored keys for determining whether said associated keys and residues are valid; and said second storage protection cache array includes a second plurality of compartments for containing:

(a) a plurality of stored reference bits and change bits respectively associated with a corresponding element in said first plurality of compartments and indicating whether data associated with said stored reference bits and change bits has been referenced or changed by a request; and (b) a plurality of stored least recently used (LRU) bits associated with said first plurality of compartments for indicating which compartment of said first plurality of compartments has been least recently used; and wherein there is included in said data processing system said storage protection store which includes at least one first storage protection store array and at least one second storage protection store array for executing said requests, each first storage protection store array including means for storing all keys necessary for accessing said main memory and having a respectively associated second storage protection store array for storing a unique reference bit and change bit for each key of all necessary keys.

4. The data processing system according to claim 2 further comprising:

a comparator for determining whether a storage protection cache hit or a storage protection cache miss has occurred:

a controller for updating said reference, change, and LRU bits if a storage protection cache hit has occurred;

logic for selecting a least recently used element in a compartment and associated residue, key, reference bit, and change bit for transfer to said storage protection store if a storage protection cache miss has occurred;

said updating following said storage protection cache hit occurring in the same amount of time as said selecting following said storage protection cache miss.

5. The data processing system according to claim 3 wherein:

said storage protection store stack directory coupled to said storage protection store stack includes:
(a) a request stack position;
(b) a request completion status;
(c) a set of request storage protection store array requirements for specifying which of said first and second storage protection store arrays are required for execution of said request; and
(d) a set of storage protection store putaway bits for indicating whether a request must put away an update to its said reference bits and change bits into said first and second storage protection cache arrays or into said second storage protection store array.

6. The data processing system according to claim 3 further comprising:

a scheduler for scheduling execution of said requests from either said storage protection cache or from said storage protection store stack into said first and second storage protection store arrays.

7. The data processing system according to claim 3 further comprising:

a cross reference storage array for holding pointers for said first and second storage protection store arrays and for enabling the proper routing of responses to said requests returning from said first and second storage protection store arrays.

8. The data processing system according to claim 2 wherein said request is one of: a set storage key; an insert storage key; a reset reference bit; a key fetch and reference and change castout; a key fetch and reference and change putaway; and a key fetch and reference and change castout and reference and change putaway.

9. The data processing system according to claim 2 wherein said storage protection cache includes lock logic for associating a completed request with its requestor and for preventing subsequent unnecessary action on said completed request resulting from any alternating misses in said first and second storage protection cache arrays and said portion of said hierarchical memory.

10. The data processing system according to claim 4 wherein said storage protection cache pipeline is a plural cycle pipeline and said first storage protection cache array is accessed in a first cycle of said storage protection cache pipeline and said second storage protection cache array is accessed in a subsequent cycle of said storage protection cache pipeline and said updating following said storage protection cache hit as well as said selecting following said storage protection cache miss occurs in one pass through said storage protection cache pipeline.

* * * * *